United States Patent
Müeller et al.

(10) Patent No.: US 10,298,726 B2
(45) Date of Patent: May 21, 2019

(54) REDUNDANTLY OPERABLE COMMUNICATION SYSTEM FOR AN INDUSTRIAL AUTOMATION SYSTEM AND METHOD FOR OPERATING THE SYSTEM

(71) Applicant: Siemens Aktiengesellschaft, Munich (DE)

(72) Inventors: Jörg Müeller, Linkenheim (DE); Hermann Angst, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/719,045

(22) Filed: Sep. 28, 2017

(65) Prior Publication Data

US 2018/0097919 A1 Apr. 5, 2018

(30) Foreign Application Priority Data

Sep. 30, 2016 (EP) .................................. 16191778

(51) Int. Cl.
*H04L 12/14* (2006.01)
*H04L 12/823* (2013.01)
(Continued)

(52) U.S. Cl.
CPC ............ *H04L 69/40* (2013.01); *G05B 19/058* (2013.01); *G05B 19/41855* (2013.01);
(Continued)

(58) Field of Classification Search
None
See application file for complete search history.

(56) References Cited

U.S. PATENT DOCUMENTS 8,380,126 B1 2/2013 Ma et al.
2014/0369182 A1 12/2014 De Blasio et al.

FOREIGN PATENT DOCUMENTS

| EP | 2571190 | 3/2013 |
|---|---|---|
| WO | WO2010/057655 | 5/2010 |
| WO | WO2014/187893 | 11/2014 |

OTHER PUBLICATIONS

Rentschler Markus et al., "Performance Analysis of Parallel Redundant WLAN", Proceedings of 2012 IEEE 17th International Conference on Emerging Technologies & Factory Automation (ETFA 2012), Krakow; Poland; Sep. 17-21, 2012, pp. 1-8.
(Continued)

*Primary Examiner* — Jason E Mattis
*Assistant Examiner* — Hong Shao
(74) *Attorney, Agent, or Firm* — Cozen O'Connor

(57) ABSTRACT

A redundantly operable communication system for an industrial automation system, wherein a first communication device is redundantly connected to a third communication network connection of first and second network infrastructure devices, the second communication device is redundantly connected to a third communication network connection of a third and fourth network infrastructure device, where the first and third network infrastructure device and the second and fourth network infrastructure devices are interconnected via their first and second communication network connections such that, while the first and second communication device identify data frames to be redundantly transmitted via a first indicator, the first and third network infrastructure devices and the second and fourth network infrastructure devices identify data frames to be redundantly transmitted via a second or third indicator that differs from the first indicator, and reject data frames
(Continued)

received on the third communication connection and identified via the second or third indicator.

7 Claims, 2 Drawing Sheets

(51) Int. Cl.
| | |
|---|---|
| *H04L 12/707* | (2013.01) |
| *H04L 12/24* | (2006.01) |
| *H04L 29/14* | (2006.01) |
| *G05B 19/05* | (2006.01) |
| *G05B 19/418* | (2006.01) |
| *H04L 12/40* | (2006.01) |
| *H04L 12/935* | (2013.01) |
| *H04L 29/08* | (2006.01) |
| *G08C 17/02* | (2006.01) |

(52) U.S. Cl.
CPC .... *H04L 12/40176* (2013.01); *H04L 41/0654* (2013.01); *H04L 45/22* (2013.01); *H04L 47/32* (2013.01); *G08C 17/02* (2013.01); *G08C 2201/63* (2013.01); *H04L 49/3063* (2013.01); *H04L 67/12* (2013.01); *H04L 2012/4026* (2013.01)

(56) References Cited

OTHER PUBLICATIONS

Kassis Marco T. et al., "Analysis of Parallel Redundant WLAN with Timing Diversity"; 2013 World Congress on Computer and Information Technology (WCCIT); IEEE, Jun. 22, 2013; pp. 1-6.
Search Report dated Mar. 16, 2017.

REDUNDANTLY OPERABLE COMMUNICATION SYSTEM FOR AN INDUSTRIAL AUTOMATION SYSTEM AND METHOD FOR OPERATING THE SYSTEM

BACKGROUND OF THE INVENTION

1. Field of the Invention

The invention relates to industrial automation systems and, more particularly, to a redundantly operable communication system for an industrial automation system and method for operating the system.

2. Description of the Related Art

Industrial automation systems are used to monitor, control and regulate technical processes, particularly in the field of production, process and building automation or traffic and transport systems, and enable an operation of control units, sensors, machinery, means of transport and industrial plants which is intended to be performed as autonomously and as independently from human intervention as possible. Due to a constantly increasing importance of information technology for automation systems comprising numerous networked control and computer units, methods for reliably providing functions distributed over an automation system are becoming increasingly important for providing monitoring, control and regulating functions. A transmission of measurement and control information for monitoring, control and regulation functions is normally highly time-critical.

Interruptions of communication connections between computer units of an industrial automation system or automation devices can result in an unwanted or unnecessary repetition of a transmission of a service request. Furthermore, messages that have not been transmitted or which have not been transmitted in their entirety or in a timely manner may prevent a transition or continuation in terms of a reliable operating state. In industrial automation systems, one particular problem is regularly caused by message traffic with comparatively numerous but relatively short messages, as a result of which the above problems are exacerbated.

In order to compensate for outages of communication connections or devices, communication protocols, such as Media Redundancy Protocol, High-availability Seamless Redundancy or Parallel Redundancy Protocol, have been developed for high-availability, redundantly operable industrial communication networks. Media Redundancy Protocol (MSR) is defined in the International Electrotechnical Commission (IEC) Standard 62439 and enables a compensation for individual connection outages in networks with a simple ring topology in the case of collision-affected redundant transmission of messages. According to the Media Redundancy Protocol, a redundancy manager that monitors the network for connection outages and, if necessary, initiates a switching measure for a ring closure is allocated to a switch with two ports within the ring topology.

Collision-affected media redundancy methods can essentially be implemented with relatively little outlay. However, it is disadvantageous that, on the one hand, messages may be lost in the event of a fault and, on the other hand, a fault condition is initially present during a reconfiguration of a communication network. A fault condition of this type must be secured by an overlaid communication protocol, for example, via TCP/IP in the switching or transport layer, in order to avoid an interruption of a communication connection.

High-availability Seamless Redundancy (HSR) and the Parallel Redundancy Protocol (PRP) are defined in the IEC 62439-3 standard and enable a collision-free redundant transmission of messages with extremely short recovery times. According to High-availability Seamless Redundancy and the Parallel Redundancy Protocol, each message is duplicated by a transmitting communication device and is sent to a receiver on two different paths. Redundant messages representing duplicates are filtered from a received data stream by a communication device at the receiving end.

EP 2 634 973 B1 discloses a communication device for a redundantly operable industrial communication network, where the device comprises at least a first and a second transceiver unit that each have an interface for a network connection of the industrial communication network. A signal-processing unit is connected to the first and second transceiver unit. A simply connected network node is connected via a coupling element to the signal-processing unit. The signal-processing unit is connected via a first and second interface to the coupling element. The first interface is provided exclusively for a transmission of data packets received by the first receiving unit of received data packets, while the second interface is provided exclusively for a transmission of data packets received by the second receiving unit.

EP 2 670 078 B1 discloses a communication device for a redundantly operable industrial communication network comprising a plurality of first and second transceiver units that each have an interface for a network connection of the industrial communication network and are each allocated to one of a plurality of redundantly operable subnetworks. The first and second transceiver units are connected via a coupling unit to a signal-processing unit common to all redundantly operable subnetworks. In each case, a virtual local network is set up for each pair of a first transceiver unit and a second transceiver unit allocated to the first transceiver unit, along with a connection allocated to the signal-processing unit. For all first and second transceiver units, the signal-processing unit forwards messages that are to be transmitted in parallel to the respective first and second transceiver unit based on an identifier of the respective virtual local network and detects received redundant messages.

In the IEC 62439-3 standard, only wired transmission paths have hitherto been prescribed for the Parallel Redundancy Protocol (PRP) due to relatively long latency delays in wireless communication systems and a resulting non-deterministic transmission behavior. A suitability of WLAN transmission paths in PRP communication networks is investigated in "Towards a Reliable Parallel Redundant WLAN Black Channel", Markus Rentschler, Per Laukemann, IEEE 2012. With parallel use of different diversity techniques for, for example, space, time and frequency, effects of stochastic channel fading can be adequately compensated in WLAN communication networks.

EP 2 712 124 B1 discloses a redundantly operable industrial communication system with communication devices redundantly connected to an industrial communication network, in which a message transmission is performed wirelessly, at least in sections. In the industrial communication network, a plurality of buffer storage units are provided for message elements received in a wired manner on a network node and to be transmitted wirelessly by the network node. If a maximum buffer size is exceeded, an oldest message element located in the respective buffer storage unit is deleted. Until the maximum buffer size is exceeded, the oldest message element is selected as the next message element to be transmitted wirelessly.

European patent application 16157779.6 discloses a redundantly operable industrial communication system in which a first communication device with a redundancy function is connected redundantly via a first and second communication network connection to a first switch, or the like. Correspondingly, a second communication device with a redundancy function is connected redundantly via a first and second communication network connection to a second switch, or the like. Data frames transmitted from the first communication network connection of the first and second communication device to the respective switch are allocated to a first virtual local network, while data frames transmitted from the second communication network connection of the first and second communication device to the respective switch are allocated to a second virtual local network. Data frames allocated to the first virtual local network are transmitted via a respective first mobile transceiver station via a first mobile network, while data frames allocated to the second virtual local network are transmitted via a respective second mobile transceiver station via a second mobile network.

European patent application 16167676.2 discloses a mobile communication system for an industrial automation system in which at least a first and a second communication device are redundantly connected to an industrial communication network. The first and the second communication device are each connected directly or indirectly via their first connection and via their second communication network connection to a respective first and to a respective second mobile user or mobile base station. The mobile user stations exchange messages with one another via available mobile base stations and, via the messages, coordinate which of the mobile user stations has an exclusive authorization for a mobile connection to a selected mobile base station at the present time or within a definable time period.

The IEC 62439-3 standard essentially provides only two mutually independent redundant communication paths for the Parallel Redundancy Protocol (PRP). For some applications, however, a restriction to only two redundant communication paths is not sufficient. One example of applications of this type concerns communication systems with mobile transmission paths, particularly in which interconnected mobile stations move at high speed in relation to one another and roaming problems must be taken into account.

SUMMARY OF THE INVENTION

It is an object of the present invention to provide a communication system for an industrial automation system which offers high resilience, even with the use of critical transmission paths, and to provide a method for operation of the system.

These and other objects and advantages are achieved in accordance with the invention by a method and redundantly operable communication system in which the redundantly operable communication system in accordance with the invention for an industrial automation system comprises at least a first and second communication device and at least four network infrastructure devices. The first and second communication device each comprise at least a first and second communication network connection and a signal-processing unit connected to the first and second communication network connection. The signal-processing unit has a multiplexer unit for the parallel forwarding data frames that are to be transmitted to both communication network connections, and a redundancy-handling unit which is configured to detect received redundant data frames and to reject data frame duplicates. The four network infrastructure devices each comprise a first, second and third communication network connection and a signal-processing unit connected to the first to third communication network connection. The signal-processing unit has a multiplexer unit for parallel forwarding data frames received on the third communication network connection to the first and second communication network connection, and a redundancy-handling unit which is designed and configured to detect redundant data frames received on the first and second communication network connection and to reject data frame duplicates prior to a forwarding to the third communication network connection.

In accordance with the invention, the first communication device is connected redundantly to the third communication network connection of a first and second network infrastructure devices, while the second communication device is connected redundantly to the third communication network connection of a third and fourth network infrastructure device. The first and third network infrastructure device are each interconnected via their first and second communication network connection, while the second and fourth network infrastructure device are each interconnected via their first and second communication network connection. The first to fourth network infrastructure device are RedBoxes in accordance with IEC standard 62439-3. Furthermore, the first to third indicators each comprise a PRPsuffix in accordance with IEC standard 62439-3 that is inserted into a Redundancy Control Trailer of a data frame which is to be redundantly transmitted.

In accordance with the invention, the first and second communication device are configured to identify data frames that are to be redundantly transmitted via a first indicator, while the first and third network infrastructure device are each configured to identify data frames that are to be redundantly transmitted via a second indicator that differs from the first indicator, and to reject data frames received on the third communication connection and identified via the second indicator. In addition, the second and fourth network infrastructure device are configured to identify data frames that are to be redundantly transmitted via a third indicator that differs from the first indicator and to reject data frames received on the third communication connection and identified via the third indicator. Four redundant transmission paths can be used in this way for a collision-free data transmission. Based on the present invention, network infrastructure devices can be cascaded even further to increase the number of usable transmission paths.

In accordance with one preferred embodiment of the present invention, the first and third network infrastructure device are wirelessly interconnected, while the second and fourth network infrastructure device are wirelessly interconnected. The first to fourth network infrastructure device can each be connected to two mobile transceiver stations.

The first to fourth network infrastructure device are preferably RedBoxes in accordance with IEC standard 62439-3. In accordance with a further advantageous embodiment of the present invention, the first to third indicators each comprise a PRPsuffix in accordance with IEC standard 62439-3 that is inserted into a Redundancy Control Trailer of a data frame which is to be redundantly transmitted. Here, the first indicator preferably has 0x88FB as a value. The second and third indicator are advantageously identical.

In accordance with a further embodiment of the present invention, the first communication device is connected redundantly via its first and second communication network connection to the third communication network connection of the first and second network infrastructure device, while the second communication device is connected redundantly via its first and second communication network connection to the third communication network connection of the third and fourth network infrastructure device.

Corresponding to the method in accordance with the invention for the redundant operation of a communication system as detailed above, the first and second communication device identify data frames that are to be redundantly transmitted via a first indicator. The first to fourth network infrastructure device are RedBoxes in accordance with IEC standard 62439-3. The first and third network infrastructure device identify data frames that are to be redundantly transmitted via a second indicator that differs from the first indicator, and reject data frames received on the third communication connection and identified via the second indicator. The second and fourth network infrastructure device identify data frames that are to be redundantly transmitted via a third indicator that differs from the first indicator, and reject data frames received on the third communication connection and identified via the third indicator. The first to third indicator are in each case a PRPsuffix according to IEC standard 62439-3 that is inserted into a Redundancy Control Trailer of a data frame that is to be redundantly transmitted. The second and third indicator are preferably identical.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in detail below on the basis of an example embodiment with reference to the drawings, in which.

DETAILED DESCRIPTION OF THE EXEMPLARY EMBODIMENTS

Figure 1:
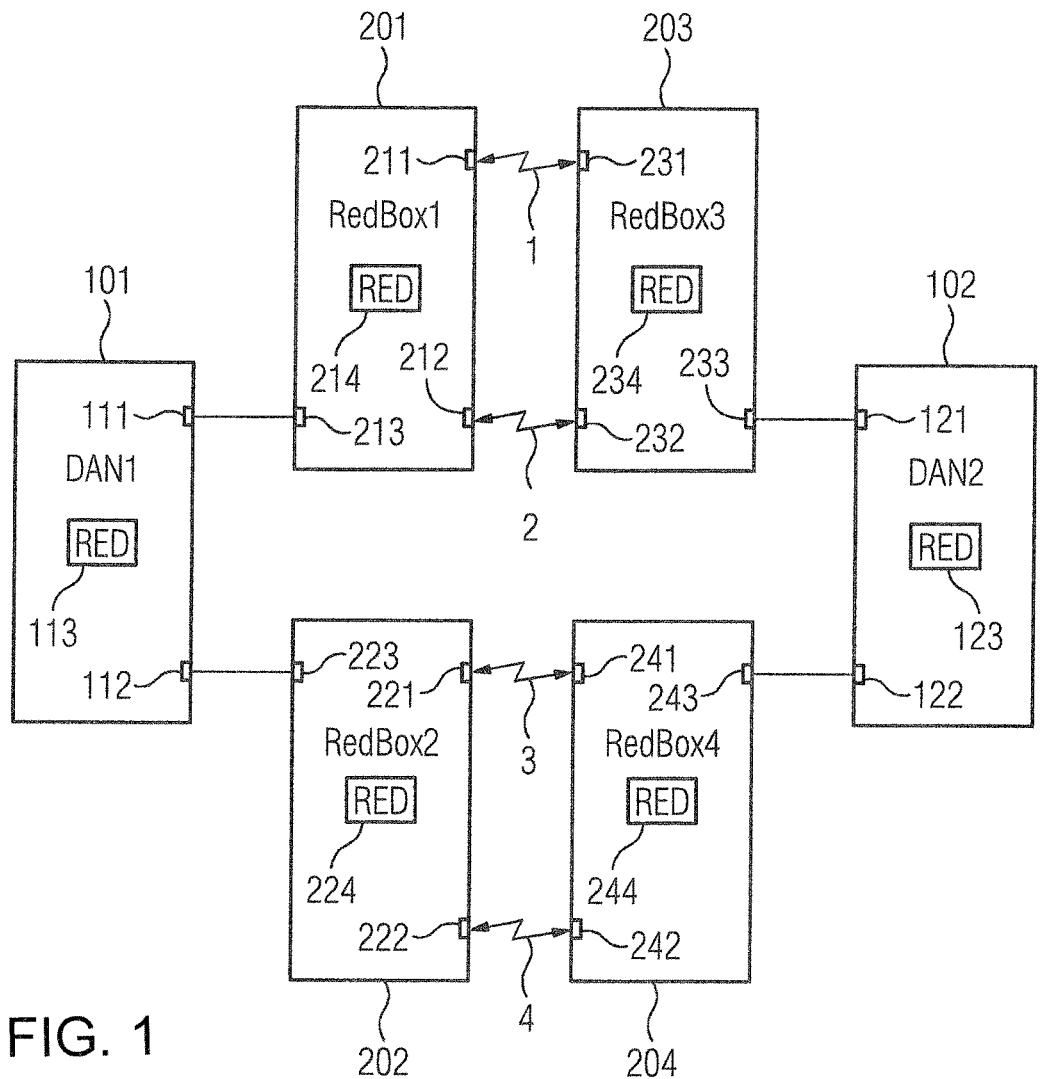
FIG. 1 shows a redundantly operable communication system for an industrial automation system, where the communication system 2 comprises communication devices and four network infrastructure devices.

The communication system shown in FIG. 1 comprises a first 101 and second communication device 102 and also four PRP RedBoxes 201-204 in accordance with International Electrotechnical Commission (IEC) standard 62439-3 as network infrastructure devices. The two communication devices 101, 102 each have at least a first 111, 121 and second communication network connection 112, 122, and a signal-processing unit 113, 123 connected to the respective first and second communication network connection 111-112, 121-122. The signal processing units 130, 123 may be implemented, for example, via an FPGA and may each comprise a multiplexer unit for parallel forwarding data frames that are to be transmitted to both communication network connections 111-112, 121-122, and a redundancy-handling unit that is configured to detect received redundant data frames and to reject data frame duplicates in accordance with IEC standard 62439-3.

The first 101 and second communication device 102 may essentially also comprise RedBoxes in accordance with IEC standard 62439-3 and may comprise an Interlink Port as the third communication network connection. For example, a Supervisory Control and Data Acquisition (SCADA) system may be connected to the Interlink Port of the first communication device 101 at control system level, while a sensor or actuator system of an industrial automation system may be connected to the Interlink Port of the second communication device at field level. A sensor or actuator system of this type may, for example, be a production robot, a drive for a conveyor system or an operating and observation station on a production line. Alternatively, the first 101 and second communication device 102 may also be allocated as a fixed or mobile station to a communication system of a high-speed train or other transport system.

The four PRP RedBoxes 201-204 each comprise a first 211, 221, 231, 241, second 212, 222, 232, 242 and third communication network connection 213, 223, 233, 243, and also a signal-processing unit 214, 224, 234, 244 connected to the respective first to third communication network connection 211-213, 221, 222, 223, 231, 232, 233, 241, 242, 243. The signal-processing units 214, 224, 234, 244 in each case have a multiplexer unit for the parallel forwarding to the first 211, 221, 231, 241 and second communication network connection 212, 222, 232, 242 of data frames received on the third communication network connection 213, 223, 233, 243, and a redundancy-handling unit which is designed and configured to detect redundant data frames received on the first 211, 221, 231, 241 and second communication network connection 212, 222, 232, 242 and to reject data frame duplicates prior to a forwarding to the third communication network connection 213, 223, 233, 243 in accordance with IEC standard 62439-3.

Mutually redundant data frames are identified in accordance with IEC standard 62439-3, Edition 2.0, Chapter 4.1 by a uniform sequence number that is allocated by the respective signal-processing unit 113, 123, 214, 224, 234, 244 to data frames that are to be redundantly transmitted. A storage unit that stores sequence numbers of data frames that have already been received error-free is furthermore allocated in each case to the signal-processing units 113, 123, 214, 224, 234, 244. When a new data frame is received, the respective redundancy-handling unit performs a check for correspondence with an already stored sequence number. Even if data frames that are to be redundantly transmitted are transmitted in the present exemplary embodiment in accordance with the Parallel Redundancy Protocol, the following details also apply accordingly to a transmission according to the High-availability Seamless Redundancy Protocol that is described in IEC standard 62439-3, Edition 2.0, Chapter 5.

As shown in FIG. 1, the first communication device 101 is redundantly connected to the third communication network connection 213, 223 of a first 201 and second PRP RedBox 202, while the second communication device 102 is redundantly connected to the third communication network connection 233, 243 of a third 203 and fourth PRP RedBox 204. In addition, the first and third PRP are each interconnected via their first 211, 231 and second communication network connection 212, 232. In a corresponding manner, the second 202 and fourth PRP RedBox 204 are also each interconnected via their first 221, 241 and second communication network connection 222, 242. Four separate communication network paths 1, 2, 3, 4 are thus available for a data transmission conformant with the Parallel Redundancy Protocol.

In the present exemplary embodiment, the first 201 and third PRP RedBox 203, and the second 202 and fourth PRP RedBox 204 are wirelessly interconnected. For this purpose, a mobile transceiver station can be connected in each case to each of the first 211, 221, 231, 241 and second communication network connection 212, 222, 232, 242. The mobile transceiver stations may, for example, be WLAN stations that can act as either a WLAN Access Point or a WLAN Client. Instead of WLAN stations, mobile transceiver stations for a WiMAX, UMTS, LTE mobile network or other mobile network can essentially also be used. The following details apply accordingly thereto.

The first 101 and second communication device 102 identify data frames that are to be redundantly transmitted via a first indicator. Conversely, the first and third PRP RedBox 201, 203 identify data frames that are to be redundantly transmitted via a second indicator that differs from the first indicator, and reject data frames received on the third communication network connection 213, 223 and identified via the second indicator. In a corresponding manner, the second 202 and fourth PRP RedBox 204 identify data frames that are to be redundantly transmitted via a third indicator that similarly differs from the first indicator, and reject data frames received on the third communication connection and identified via the third indicator. The second and third indicator are preferably identical.

The first to third indicators each comprise a PRPsuffix in accordance with IEC standard 62439-3, Edition 2.0, Chapter 4.1.10.2.2 which is inserted into a Redundancy Control Trailer of a data frame which is to be redundantly transmitted. A detailed description of the Redundancy Control Trailers can be found in IEC standard 62439-3, Edition 2.0, Chapter 4.2.7.3. In the present exemplary embodiment, 0x88FB is selected as a value for the first indicator, while application-specific or user-specific values are selected for the second and third indicator. The present exemplary embodiment thus offers the advantage that a plurality of PRP instances are distinguishable through modification of PRP protocol information, and four or more redundant PRP transmission paths can be implemented.

Figure 2:
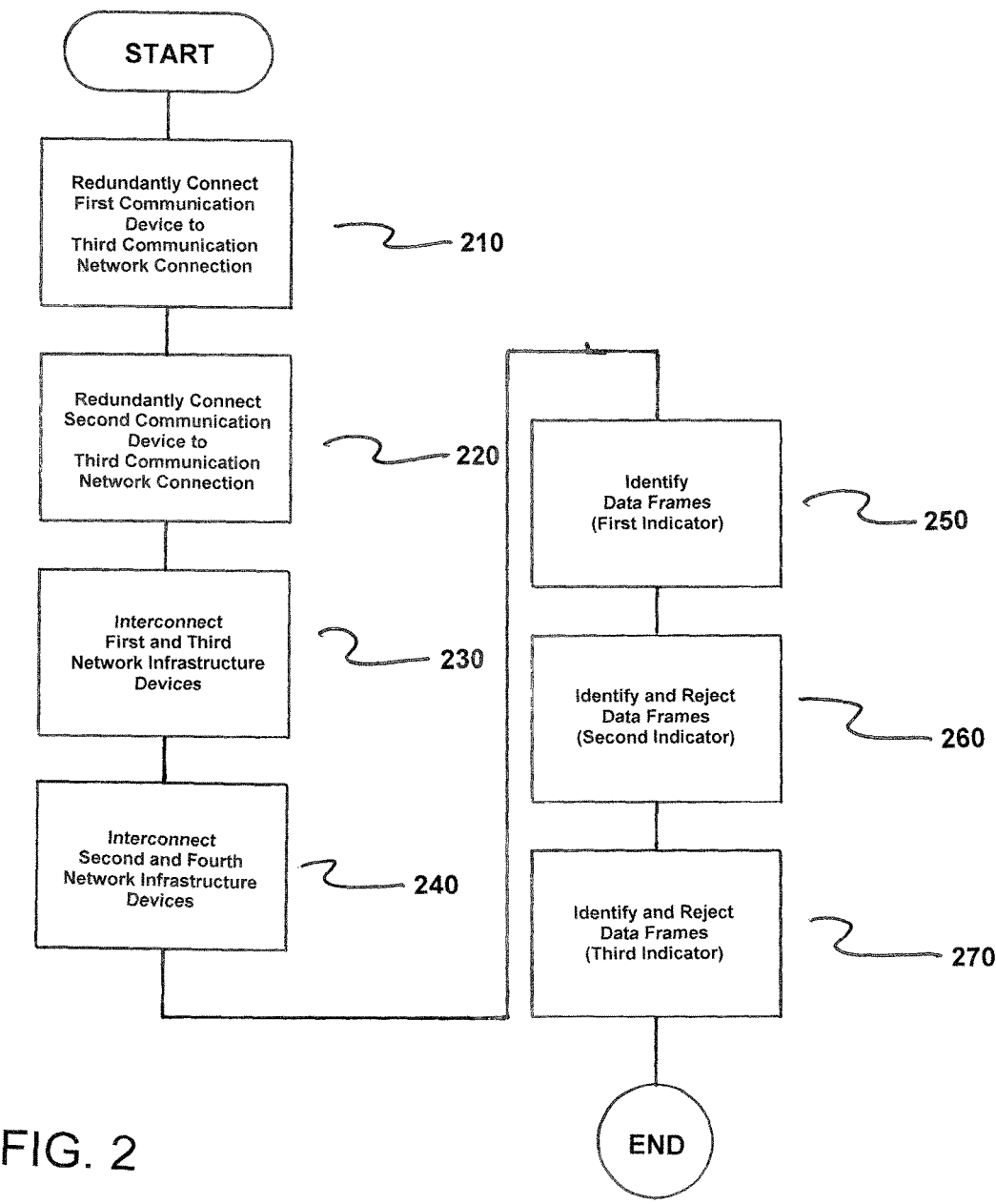
FIG. 2 is a flowchart of the method in accordance with the invention.

FIG. 2 is a flowchart of the method for redundant operation of a communication system for an industrial automation system. In accordance with the invention, the industrial automation system has at least a first 101 and second communication device 102, which each includes at least a first 111, 121 and second communication network connection 112, 122, and a signal-processing unit 113, 123 connected to the first and second communication network connection, and includes a multiplexer unit for parallel forwarding data frames which are to be transmitted to both communication network connections, and a redundancy-handling unit which is configured to detect received redundant data frames and to reject data frame duplicates. The industrial communication system also has at least four network infrastructure devices 201, 202, 203, 204, where each of the at least four network infrastructure devices 201, 202, 203, 204 includes a first 211, 221, 231, 241, second 212, 222, 232, 242 and third communication network connection 213, 223, 233, 243, a signal-processing unit 214, 224, 234, 244 connected to the first to third communication network connection, and includes a multiplexer unit for parallel forwarding data frames received on the third communication network connection to the first and second communication network connection, and a redundancy-handling unit which is configured to detect redundant data frames 11, 12 received on the first and second communication network connection and to reject data frame duplicates prior to forwarding data frames to the third communication network connection.

The method comprises redundantly connecting the first communication device 101 to the third communication network connection of a first 201 and second network infrastructure device 202, as indicated in step 210.

Next, the second communication device 102 is redundantly connecting to the third communication network connection of a third 203 and fourth network infrastructure device 204, as indicated in step 220. Next, the first and third network infrastructure devices are each interconnected via their first and second communication network connection, as indicated in step 230.

The second and fourth network infrastructure device are now interconnected via their first and second communication network connection, as indicated in step 240. In accordance with the invention, the first to fourth network infrastructure devices being RedBoxes in accordance with International Electrotechnical Commission (IEC) standard 62439-3.

Next, the first and second communication devices identify data frames which are to be redundantly transmitted via a first indicator, as indicated in step 250.

Next, the first and third network infrastructure devices identify data frames which are to be redundantly transmitted via a second indicator which differs from the first indicator, and rejecting data frames received on the third communication connection and identified via the second indicator, as indicated in step 260.

Next, the second and fourth network infrastructure devices identify data frames which are to be redundantly transmitted via a third indicator which differs from the first indicator, and rejecting data frames received on the third communication connection and identified by the third indicator, as indicated in step 270. In accordance with the invention, the first to third indicators each comprises a PRPsuffix in accordance with IEC standard 62439-3 that is inserted into a Redundancy Control Trailer of a data frame which is to be redundantly transmitted.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A redundantly operable communication system for an industrial automation system comprising:

at least a first and second communication device, each of said first and second communication devices having at least a first and second communication network connection;

a signal-processing unit connected to the first and second communication network connection and including a multiplexer unit for the parallel forwarding to both communication network connections of data frames that are to be transmitted and a redundancy-handling unit which detects received redundant data frames and rejects data frame duplicates;

at least four network infrastructure devices, each of said at least four network infrastructure devices case including a first, a second and a third communication network connection;

a signal-processing unit connected to the first to third communication network connection and including a multiplexer for parallel forwarding data frames received on the third communication network connection to the first and second communication network connection, and including a redundancy-handling unit which detects redundant data frames received on the first and second communication network connection and rejects data frame duplicates prior to forwarding data frames to the third communication network connection;

wherein the first communication device is redundantly connected to the third communication network connection of a first and second network infrastructure device;

wherein the second communication device is redundantly connected to the third communication network connection of a third and fourth network infrastructure device;

wherein the first and third network infrastructure device are interconnected in each case via their first and second communication network connection;

wherein the second and fourth network infrastructure device are each interconnected via their first and second communication network connections;

wherein the first to fourth network infrastructure devices are RedBoxes in accordance with International Electrotechnical Commission (IEC) standard 62439-3;

wherein the first and second communication devices are configured to identify data frames which are to be redundantly transmitted via a first indicator;

wherein the first and third network infrastructure device are each configured to identify data frames which are to be redundantly transmitted via a second indicator which differs from the first indicator, and to reject data frames received on the third communication connection and identified via the second indicator;

wherein the second and fourth network infrastructure device are configured to identify data frames which are to be redundantly transmitted via a third indicator which differs from the first indicator and to reject data frames received on the third communication connection and identified via the third indicator; and wherein the first to third indicator are in each case a PRPsuffix in accordance with IEC standard 62439-3 which is inserted into a Redundancy Control Trailer of a data frame which is to be redundantly transmitted.

2. The communication system as claimed in claim 1, wherein the first and third network infrastructure devices are wirelessly interconnected; and wherein the second and fourth network infrastructure device are wirelessly interconnected.

3. The communication system as claimed in claim 2, wherein the first to fourth network infrastructure devices are each connected to two mobile transceiver stations.

4. The communication system as claimed in claim 1, wherein the first indicator has 0x88FB as a value.

5. The communication system as claimed in claim 1, wherein the second and third indicators are identical.

6. The communication system as claimed in claim 1, wherein the first communication device is connected redundantly via its first and second communication network connection to the third communication network connection of the first and second network infrastructure devices; and wherein the second communication device is connected redundantly via its first and second communication network connection to the third communication network connection of the third and fourth network infrastructure device.

7. A method for redundant operation of a communication system for an industrial automation system including at least a first and second communication device, each of said first and second communication devices having at least a first and second communication network connection, and a having signal-processing unit connected to the first and second communication network connection, the industrial automation system further including a multiplexer unit for parallel forwarding data frames which are to be transmitted to both communication network connections, and a redundancy-handling unit which is configured to detect received redundant data frames and to reject data frame duplicates, the industrial communication system having at least four network infrastructure devices, each at least four network infrastructure devices including a first, a second and a third communication network connection, and a signal-processing unit connected to the first to third communication network connections, the industrial automation system further including a multiplexer unit for the parallel forwarding data frames received on the third communication network connection to the first and second communication network connection and a redundancy-handling unit which is configured to detect redundant data frames received on the first and second communication network connection and to reject data frame duplicates prior to forwarding data frames to the third communication network connection, the method comprising:

redundantly connecting the first communication device to the third communication network connection of a first and second network infrastructure device;

redundantly connecting the second communication device to the third communication network connection of a third and fourth network infrastructure device;

interconnecting the first and third network infrastructure devices respectively via their first and second communication network connections;

interconnecting the second and fourth network infrastructure devices respectively via their first and second communication network connections, the first to fourth network infrastructure devices being RedBoxes in accordance with International Electrotechnical Commission (IEC) standard 62439-3;

identifying by the first and second communication devices data frames which are to be redundantly transmitted via a first indicator;

identifying by the first and third network infrastructure devices data frames which are to be redundantly transmitted via a second indicator which differs from the first indicator, and rejecting data frames received on the third communication connection and identified via the second indicator; and identifying by the second and fourth network infrastructure devices data frames which are to be redundantly transmitted via a third indicator which differs from the first indicator, and rejecting data frames received on the third communication connection and identified by the third indicator;

wherein the first to third indicators each comprises a PRPsuffix in accordance with IEC standard 62439-3 which is inserted into a Redundancy Control Trailer of a data frame which is to be redundantly transmitted.

* * * * *